J. W. HOWLET.
Feather Renovator.
No. 965.
Patented Oct. 5, 1838.
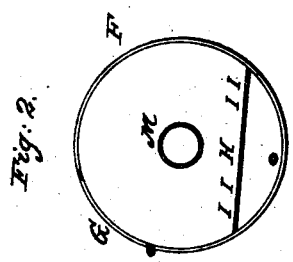
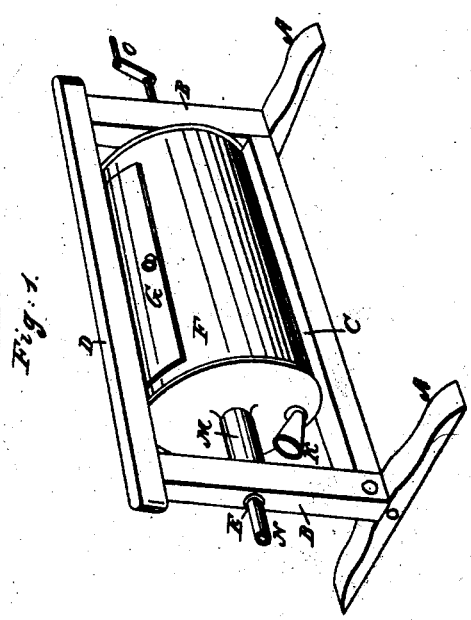

UNITED STATES PATENT OFFICE.

JNO. W. HOWLET, OF GREENSBORO, NORTH CAROLINA.

MACHINE FOR WASHING AND DRESSING FEATHERS.

Specification of Letters Patent No. 965, dated October 5, 1838.

*To all whom it may concern:*

Be it known that I, JONATHAN W. HOWLET, of Greensboro, in the county of Guilford and State of North Carolina, have invented a new and Improved Useful Mode for Washing, Preserving, Purifying, and Cleansing Feathers; and I do hereby declare that the following is a full and exact description, reference being had to the annexed drawings.

Figure 1 represents a perspective view. Fig. 2 a section.

Two sills A A four feet long, two upright pieces B B framed into the center of the aforesaid sills, eight feet long, one piece C six feet long mortised into the sides of the sills at the bottom and another D of the same length mortised into the upright pieces at top, a notch or hole E about fifty inches from the bottom of the upright pieces for a gudgeon to work in, a tin or wooden cylinder F thirty two inches in diameter and six or eight feet long, with a door G in the side for the purpose of putting in feathers, is hung between the two upright pieces by gudgeons attached to the end of the cylinder, which gudgeons pass through the holes or notches in the two upright pieces. A segment of this large cylinder is cut off by a partition H running through the cylinder from one end to the other, about six inches from its circumference, which division of the cylinder is intended as a reservoir for boiling water, which is let on to the feathers in the larger division of the cylinder, by means of a large number of small holes I punched in the partition, and again drained off by the same apertures. At one end of the smaller division there is a funnel K attached for the purpose of passing water into it, and a stop cock at the other to draw it off when no longer wanted.

There is one metal cylinder M six inches in diameter passing through the center of the large cylinder, and projecting an inch and a half on each end, which projections are to answer as a gudgeon for the whole to revolve upon. Into one end of this small cylinder a stove pipe N is inserted for the purpose of conducting heat from the stove into the said cylinder for the purpose of drying the feathers after they have been washed.

At one end of the large cylinder there is a crank O for the purpose of giving a rotary motion to the whole machine.

By the above machine it is believed that feathers either new or old may be effectually washed and cleansed, made more elastic and durable, and the beds which are composed of them rendered more comfortable with a less quantity of feathers than when used in any other manner.

What I claim as my invention and desire to secure by Letters Patent is—

The partition and small cylinder M in combination with the cylinder F, in the manner and for the purpose herein set forth.

J. W. HOWLET.

Witnesses:
 JACOB HUBBARD,
 JOHN A. GILMER.